(12) United States Patent
Liesener et al.

(10) Patent No.: US 10,696,206 B2
(45) Date of Patent: Jun. 30, 2020

(54) SIGNAL LIGHT INTEGRATED IN A MODULE HOUSING AND CONTROL AND MONITORING CIRCUIT FOR CONTROLLING SAME

(71) Applicant: SMR Patents S.à.r l., Luxembourg (LU)

(72) Inventors: Alf Liesener, Remshalden (DE); Stefanie Göttlicher, Stuttgart (DE); Romeo Wieczorek, Esslingen (DE); Daniel Fritz, Stuttgart (DE); Ilka Rötzer, Denkendorf (DE)

(73) Assignee: SMR Patents S.à.r.l., Luxembourg (LU)

( * ) Notice: Subject to any disclaimer, the term of this patent is extended or adjusted under 35 U.S.C. 154(b) by 24 days.

(21) Appl. No.: 15/377,571

(22) Filed: Dec. 13, 2016

(65) Prior Publication Data
US 2018/0147977 A1 May 31, 2018

(30) Foreign Application Priority Data
Nov. 28, 2016 (DE) .......................... 10 2016 122 933

(51) Int. Cl.
*H05B 45/20* (2020.01)
*B60Q 1/00* (2006.01)
(Continued)

(52) U.S. Cl.
CPC .......... *B60Q 1/0023* (2013.01); *B60Q 1/0011* (2013.01); *B60Q 1/2607* (2013.01); *B60Q 1/2665* (2013.01); *B60Q 1/2696* (2013.01); *B60Q 1/34* (2013.01); *B60Q 1/38* (2013.01); *B60Q 1/46* (2013.01); *B60Q 1/48* (2013.01); *B60Q 1/50* (2013.01); *B60Q 1/525* (2013.01); *B60R 1/00* (2013.01); *B60Q 2400/20* (2013.01); *B60Q 2900/30* (2013.01)

(58) Field of Classification Search
CPC ............. B60R 11/04; B60R 2001/1253; B60R 21/01538
See application file for complete search history.

(56) References Cited

U.S. PATENT DOCUMENTS 5,369,554 A * 11/1994 Erion .................... B60Q 1/0011
362/516
6,509,832 B1 * 1/2003 Bauer ................... B60Q 1/0023
340/425.5

(Continued)

*Primary Examiner* — Henry Luong
(74) *Attorney, Agent, or Firm* — Jones Day

(57) ABSTRACT

A camera module housing of a vehicle includes at least a first light source adapted to radiate light having a first color, a second light source adapted to radiate light having a second color, wherein the first color is different from the second color, at least a first opening in the aperture of the camera module housing adapted to allow for light passing through from the first light source, at least a second opening in the aperture of the camera housing adapted to allow for light passing through from the second light source, where the first and second opening are arranged around a lens of the camera. A control circuit for controlling a lighting application in a vehicle includes at least a voltage input channel for receiving an input voltage; and at least a first output channel, a first lighting device, a second output channel, and a second lighting device.

15 Claims, 7 Drawing Sheets

(51) Int. Cl.
    *B60Q 1/26*    (2006.01)
    *B60Q 1/38*    (2006.01)
    *B60Q 1/46*    (2006.01)
    *B60Q 1/34*    (2006.01)
    *B60Q 1/48*    (2006.01)
    *B60Q 1/50*    (2006.01)
    *B60Q 1/52*    (2006.01)
    *B60R 1/00*    (2006.01)

(56) References Cited

U.S. PATENT DOCUMENTS

| | | | | |
|---|---|---|---|---|
| 7,510,311 B2* | 3/2009 | Romas | B60Q 1/2665 | 362/494 |
| 2005/0276059 A1* | 12/2005 | Rodriguez Barros | B60R 1/1207 | 362/494 |
| 2011/0025215 A1* | 2/2011 | Hulett | H05B 33/0818 | 315/185 R |
| 2017/0361760 A1* | 12/2017 | Salter | F21S 43/249 | |

* cited by examiner

SIGNAL LIGHT INTEGRATED IN A MODULE HOUSING AND CONTROL AND MONITORING CIRCUIT FOR CONTROLLING SAME

CROSS-REFERENCE TO RELATED APPLICATIONS

This application claims the benefit of priority to German Patent Application DE 10 2016 122 933.4, filed Nov. 28, 2016, which is hereby incorporated by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to a signal light that is integrated in a module housing of a vehicle. For example, a vehicle may include a camera module for providing a driver with a view of the side or rear of the vehicle, and the camera module housing may include one or more signaling lamps that may be used as indicators, warning lights, blind spot assistance lights, welcoming lights, among other uses. The camera module housing may be integrated with a side-view mirror, may be separate from a side-view mirror, or may replace a side-view mirror so that the vehicle includes the camera module housing without a side-view mirror.

The following description also relates to a control circuit for controlling a lighting application in a vehicle. For example, a monitoring circuit and a rear view display device for a vehicle having such a control circuit or monitoring circuit installed therein.

2. Related Art

Turn signal lamps are used to replace side-view mirrors where turn signal lamps include a camera for providing a driver with a view of the side or rear of the vehicle. That is, side-view mirrors are being replaced with camera modules that include a lighting mechanism for turn signals. Such turn signal lamps or camera modules are typically positioned on the side of the vehicle and include light emitting diodes (LEDs) and light guides that are arranged so that drivers of other vehicles can easily detect when a driver intends to turn. For example, U.S. Patent Application Publication No. 2016/0207444 A1 to Tatara, et al. describes a camera module housing that includes light emitting diodes and light passages that are arranged for turn signal indication.

In vehicle lighting applications, lighting devices having different colors may be used and separately controllable. If several lighting devices, e.g. light sources that have different colors and which are separately controllable, are used in components of a vehicle, for example in a rear view mirror, additional wiring, such as wiring for a second supply voltage, and/or a BUS connection needs to be utilized for controlling the lighting devices independently from each other such that the indicator can alternately flash in different colors.

For example, U.S. Pat. No. 8,674,285 B2 to Drummond, et al. describes a vehicle rearview device system, wherein several devices comprised in a rear-view device are controlled via a vehicle's bus system, such as a LIN, CAN, Flexray or Ethernet system or an SMBus. However, most rear view devices do not include interfaces for an additional voltage supply and/or an interface for the vehicle's BUS system to control several lighting devices independently. Also, introducing corresponding interfaces would increase the complexity and costs of the overall system.

Therefore, camera modules that include an improved arrangement of LEDs and light guides for providing improved visibility to a driver of a vehicle is needed. Also, versatility in light indications provided by a camera module; for example, by using indicators that include more than one color is needed. Further, there is a need for an improved control circuit that can be used for controlling at least two lighting devices and that doesn't need to be connected to a vehicle's bus system, and/or doesn't need to utilize several input voltages to control the lighting devices independently.

SUMMARY

In an aspect, a camera module of a vehicle includes a signal lamp including at least a first light source adapted to radiate light having a first color, and a second light source adapted to radiate light having a second color, the first color being different from the second color; and a camera module housing comprising a first opening in an aperture of the camera module housing adapted to allow for light passing through from the first light source, and a second opening in the aperture of the camera module housing adapted to allow for light passing through from the second light source, where the first and second openings are arranged around a lens of the camera.

The first and second openings may be positioned on a boundary formed at the edge of the lens of the camera, or may be positioned on a boundary formed at the edge of the camera module housing.

The first light source may be adapted to radiate the light having the first color in response to a first event at a first time interval and the second light source may be adapted to radiate the light having the second color in response to a second event at a second time interval.

The first light source and the second light source may be light emitted diodes (LED) that are configured to emit both the first color and the second color.

The first light source may be adapted to radiate the light having the first color and the second light source may be adapted to radiate the light having the second color in response to a first event at a first time interval, and the first light source may be adapted to radiate the light having the second color and the second light source may be adapted to radiate the light having the first color in response to a second event at a second time interval.

The first light source and the second light source may be both configured to radiate the light having the first color at a first time interval according to a first desired application and may be both configured to radiate the light having the second color at a second time interval according to a second desired application.

The first light source and the second light source may be both configured to radiate the first light when used as indicator, the second light when used as warning light for blind spot detection, and a third and fourth light for signaling that the car is being locked and unlocked.

The camera module housing may further include a third opening and a fourth opening, where the first opening, the second opening, the third opening, and the fourth opening are symmetrically arranged about the lens of the camera.

The light source may be a light emitting diode (LED) that is arranged at a rear portion of the camera module housing, and the camera module further comprises a plurality of light guides connecting the LED to the first opening and the second opening.

The camera module may further include a control circuit for controlling lighting of the signal lamp.

The camera module may further include a light guide, where the light guide is positioned at least partly on an outer periphery of the camera module housing.

The first opening and the second opening may have a circular, ovular, square, rectangular, triangular, or octagonal shape.

The first light source and the second light source may be Light Emitting Diodes (LEDs), light bulbs, halogen lamps, xenon lamps, neon lamps, or electrodeless lamps.

The following description also relates to a control circuit for controlling a lighting application in a vehicle, including at least a voltage input channel for receiving an input voltage; and at least a first output channel and at least a first lighting device, wherein the first output channel is adapted to control the on and off states of the first lighting device connected to the first output channel, and at least a second output channel and at least a second lighting device, wherein the second output channel is adapted to control the on and off states of the second lighting device connected to the second output channel, wherein the first output channel is adapted to turn the first lighting device on and the second output channel is adapted to turn the second lighting device off based on a first information in the input voltage, and the first output channel is adapted to turn the first lighting device off and the second output channel is adapted to turn the second lighting device on based on a second information in the input voltage.

Here, the terms "input channel", "first output channel", and "second output channel" can be used to refer to components of the control circuit including interfaces, where a voltage can be applied to/supplied from. Also, the term "controlling the on and off states" can be used to refer to supplying a voltage at the corresponding output channel so that the lighting device connected to the output channel will start radiating light. The term "information" can be used to refer to any information in the input voltage signal, such as voltage values, frequencies, modulated signals on the input voltage, or its waveform, etc.

In one example, the first and the second lighting device comprise at least one light source each, preferably a plurality of light sources, or an array of light sources, wherein the first lighting device comprises a first light source having a first color, and wherein the second lighting device comprises a second light source having a second color, preferably the first and the second lighting device comprise one of an amber light source and blue light source.

In another example, the first and second colors are different colors, and wherein the first and second light sources are comprised in a side-turn indicator, preferably in a side-turn indicator in a rear view device of the vehicle.

In another example, the light source, preferably the plurality of light sources, comprises/comprise at least one of a Light Emitting Diode, LED, a light bulb, a halogen lamp, an arc lamp, preferably a Xenon arc lamp, a fluorescent lamp, a neon lamp, and/or an electrodeless lamp.

In yet another example, the control circuit is adapted to determine the first information by determining that the input voltage is below a threshold, and determining the second information by determining that the input voltage is above the threshold, and preferably the control circuit comprises a trigger circuit to adjust the threshold.

In another example, at least one of the first output channel and/or the second output channel comprises/comprise a delay circuit for time-delaying the output channel/output channels.

In another example, the control circuit is adapted to determine the first information by determining that the input voltage comprises a first duty cycle rate, preferably 20%, and to determine the second information by determining that the input voltage comprises a second duty cycle rate, preferably 50%, preferably wherein the duty cycle interval is 1 KHz.

In yet another example, the control circuit is adapted to determine the first information by determining that the input voltage comprises a first frequency and to determine the second information by determining that the input voltage comprises a second frequency, wherein the first and second frequencies are different.

In another example, the control circuit comprises at least one filter circuit to extract the first information and the second information from the input voltage.

In another example, the input voltage comprises the supply voltage for the first lighting device and/or second lighting device, and/or the control circuit comprises a discreet logic circuit, or a field-programmable gate array, FPGA.

The invention also relates to a monitoring circuit connected to the control circuit according to the invention and being adapted to supply the input voltage to the control circuit.

In one example of the monitoring circuit, the monitoring circuit comprises a, radio-frequency identification, RFID, receiver arranged in a passenger compartment of the vehicle, and wherein the RFID receiver is adapted to detect the presence of a least one RFID sender, preferably a plurality of RFID senders in the passenger compartment, and wherein the monitoring circuit is adapted to supply the input voltage comprising the first and second information to the control circuit as a result of detecting the removal of the RFID sender, preferably the input voltage is sent upon detecting that the vehicle is being locked.

In yet another example of the monitoring circuit, the monitoring circuit is coupled to a position detection circuit, preferably comprising a Global Positioning System, GPS, receiver, to obtain information regarding the position of the vehicle, and wherein the monitoring circuit is adapted to supply the input voltage comprising the first and second information to the control circuit as a result of detecting the position of the vehicle, preferably the input voltage is sent upon detecting that the vehicle is positioned in a no-parking zone.

In yet another example of the monitoring circuit, the monitoring circuit is coupled to an onboard diagnostic system, and wherein the monitoring circuit is adapted to supply the input voltage comprising the first and second information to the control circuit as a result of detecting a malfunctioning of the vehicle detected by the onboard diagnostic system, preferably wherein a malfunctioning is detected based on a tire pressure value, and/or fuel level value.

In another example of the monitoring circuit, the monitoring circuit comprises an interface to couple the monitoring circuit to at least one turn-indicator, preferably to all turn-indicators in the vehicle.

The invention also relates to a rear view display device for a vehicle, preferably for a motor vehicle, comprising at least one control circuit according to the invention, and/or at least one monitoring circuit according to the invention.

Advantageously, the control circuit according to the invention can control two LEDs or two groups of LEDs, having different colors by means of the input voltage signal only. Therefore, there is no need to install additional wiring, e.g. as power supply for the second lighting device, or to connect the bus system to the control circuit for controlling the LEDs. Therefore, depending on the information in the input signal, the LEDs can be made to flash in one of two colors, or alternately in two colors. For example, as warning of possible hazardous situations, or just to convey general information.

Also, advantageously by using lighting devices comprising arrays of LEDs, lighting applications can be utilized that have a good visibility. Advantageously, an amber or yellow LED or LED array can be utilized as turn signal indicator, wherein a blue LED or LED array can be used to warn for hazardous situations. Also, the interval times of the two LEDs can be adjusted so that many different information can be conveyed via a side-turn indicator that uses such a control device according to the invention.

The first and second information used to control the lighting devices can be advantageously simply deduced from the voltage level of the input voltage by determining whether the voltage is below or above a certain threshold voltage. Also, advantageously a trigger circuit, such as a Schmitt-Trigger, i.e. a comparator circuit with hysteresis, could be used to define two defined states below and above the threshold voltage. Also, when a delay circuit is used, the output of the lighting device that corresponds to a lower voltage, i.e. voltage below the threshold, can be time-delayed so that the lighting device does not start radiating light, i.e. starts radiating light in the few fractions of a second while the input voltage is increasing from below to above the threshold.

Also, alternatively, for detecting the first and second information from the voltage level, the information could be also detected from the duty cycle making the detecting process more accurate. A first duty cycle rate of 50% and a second duty cycle rate of 20% at an interval frequency of 1 KHz have proven to be especially advantageous, since these duty cycle rates allow to convey sufficient energy, while making a clear determination possible. However, in yet another example, also the frequency of the input voltage could be used to convey the first and second information. Since the invention suggests various alternative ways to convey the first and second information, the invention can be used for a wide range of applications.

Advantageously, the input voltage can be used as supply voltage for the lighting devices. Therefore, no additional voltage supply needs to used. Also, the control circuit can be built with discreet logic or realized on a field-programmable gate array, i.e. depending on the desired application.

If the control circuit is used together with a monitoring circuit according to the invention, the lighting devices can be used to warn the driver, if an item comprising an RFID sender was unintentionally left in the vehicle upon locking the vehicle, or if the vehicle is parked in a no-parking zone, or in case there is a mechanical problem, or problem of any kind, with the vehicle.

DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION OF THE INVENTION

Figure 1:
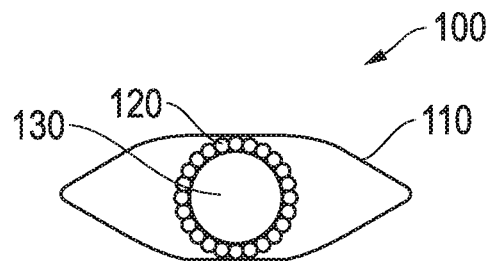
FIG. 1 is a diagram illustrating the arrangement of light passages around a camera lens that is mounted at the rear surface (seen from the driving direction) of the camera module housing.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Referring to the embodiments illustrated in FIGS. 1-5, an arrangement of a signaling lamp in a rear surface (seen from the driving direction) of a camera module housing is illustrated. The arrangement of the light passages could be variable in the front area of the camera module. However, in this description, the light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

FIG. 1 is a diagram illustrating the arrangement of light passages around a camera lens that is mounted at the rear surface (seen from the driving direction) of the camera module housing.

Referring to FIG. 1, the camera module 100 includes a camera module housing 110 that houses all components of the camera module 100. That is, the camera module housing 110 includes camera components and lighting components. As illustrated in FIG. 1, a plurality of light passages 120 are arranged around the periphery of a camera lens 130 and within the camera module housing 110. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 2:
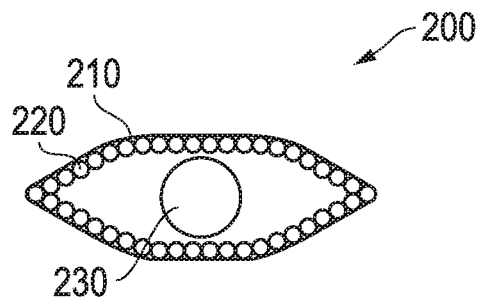
FIG. 2 is a diagram illustrating another arrangement of light passages around a camera module housing and a camera lens that is mounted at the rear surface (seen from the driving direction) of the camera module housing.

FIG. 2 is a diagram illustrating another arrangement of light passages around a camera module housing and a camera lens that is mounted at the rear surface (seen from the driving direction) of the camera module housing.

Referring to FIG. 2, the camera module 200 includes a camera module housing 210 that houses all components of the camera module 200. That is, the camera module housing 210 includes camera components and lighting components. As illustrated in FIG. 2, a plurality of light passages 220 are arranged within the periphery of the camera module housing 210 with the camera lens 230 enclosed therein. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 3:
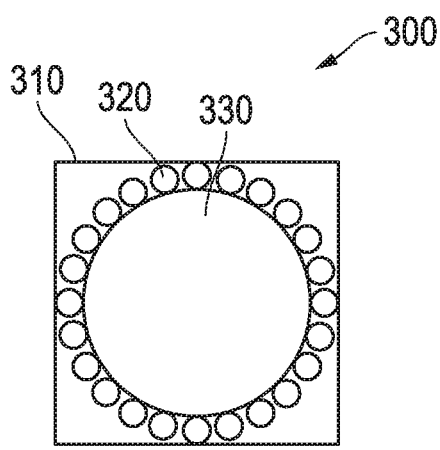
FIG. 3 is a diagram illustrating yet another arrangement of light passages around a camera lens that is mounted at the rear surface (seen from the driving direction) of the camera module housing.

FIG. 3 is a diagram illustrating yet another arrangement of light passages around a camera lens that is mounted at the rear surface (seen from the driving direction) of the camera module housing.

Referring to FIG. 3, the camera module 300 includes a camera module housing 310 that houses all components of the camera module 300. That is, the camera module housing 310 includes camera components and lighting components. As illustrated in FIG. 3, a plurality of light passages 320 are arranged around the periphery of a camera lens 330 and within the camera module housing 310. The light passages are chosen so that the light from the signaling lamp is visible from the side and behind the car and/or from the driver of the vehicle. The light passages can have essentially any shape, e.g. circular, rectangular, an icon, a freeform shape etc., and can be arranged on the surface of the camera module housing or around the lens of the camera.

Figure 4:
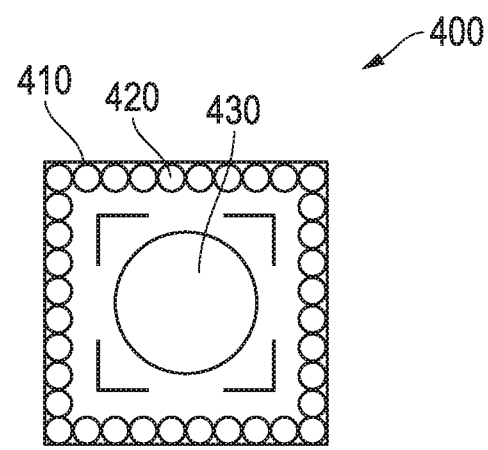
FIG. 4 is a diagram illustrating an additional arrangement of light passages around a camera module housing and a camera lens that is mounted at the rear surface (seen from the driving direction) of the camera module housing.

FIG. 4 is a diagram illustrating an additional arrangement of light passages around a camera module housing and a camera lens that is mounted at the rear surface (seen from the driving direction) of the camera module housing.

Referring to FIG. 4, the camera module 400 includes a camera module housing 410 that houses all components of the camera module 400. That is, the camera module housing 410 includes camera components and lighting components. As illustrated in FIG. 4, a plurality of light passages 420 are arranged within the periphery of the camera module housing 410 with the camera lens 430 enclosed therein. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 5:
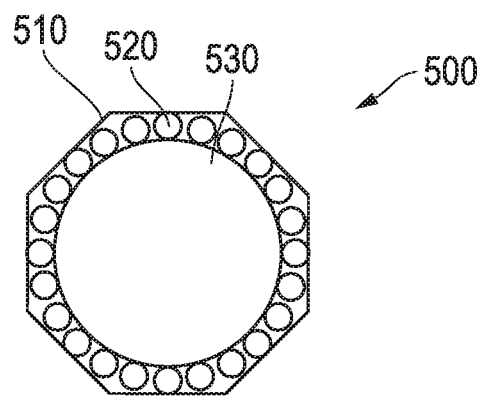
FIG. 5 is a diagram illustrating a further arrangement of light passages around a camera module housing and a camera lens that is mounted at the rear surface (seen from the driving direction) of the camera module housing.

FIG. 5 is a diagram illustrating a further arrangement of light passages around a camera module housing and a camera lens that is mounted at the rear surface (seen from the driving direction) of the camera module housing.

Referring to FIG. 5, the camera module 500 includes a camera module housing 510 that houses all components of the camera module 500. That is, the camera module housing 510 includes camera components and lighting components. As illustrated in FIG. 5, a plurality of light passages 520 are arranged within the periphery of the camera module housing 510 and around the periphery of the camera lens 530. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 6A:
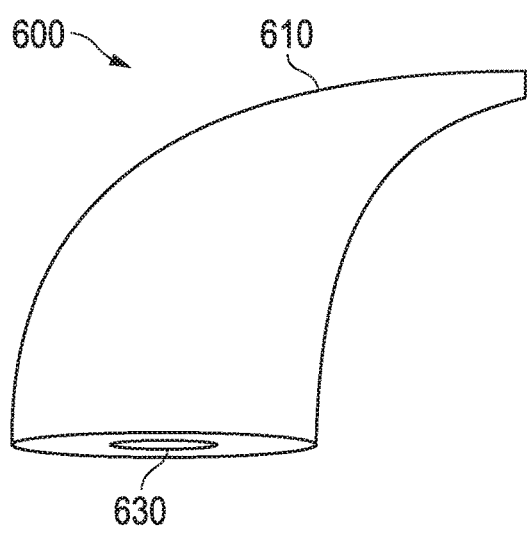
FIGS. 6A and 6B are diagrams illustrating an arrangement of an LED, light guide, and light passages in a camera module housing.
Figure 6B:
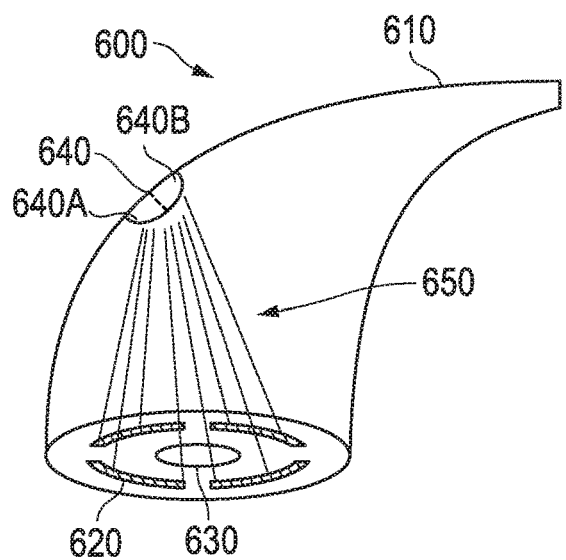

FIGS. 6A and 6B are diagrams illustrating an arrangement of an LED, light guide, and light passages in a camera module housing.

Referring to FIG. 6A, a top view of a camera module 600 including a camera module housing 610 and a camera lens 630 is illustrated. Referring to FIG. 6B, a plurality of light passages 620 are arranged around the camera lens 630 and within the camera housing 610. Also illustrated are a light source which is an LED 640 and light guides 650. The light source may be a single light source 640 or, in another example, may include a first light source 640A and a second light source 640B each including a separate LED. The light source 640 is illustrated in the alternative with dashed lines as two light sources 640A and 640B. The light guides 650 extend from the LED to each of the light passages 620 so that the light passages 620 radiate the light provided by the LED 640. As in previous examples where the light passages are arranged on the rear surface (seen from the driving direction) of the camera module housing, here also the light passages 620 are arranged on the rear surface of the camera module housing 610.

Figure 7A:
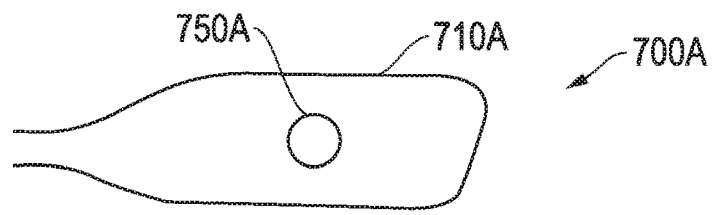
FIGS. 7A, 7B, and 7C are diagrams illustrating examples of the arrangement of a light guide on an outer surface of a camera module housing.
Figure 7B:
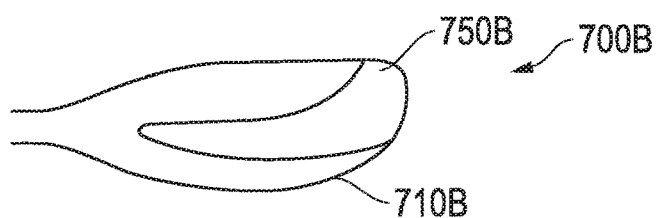
Figure 7C:
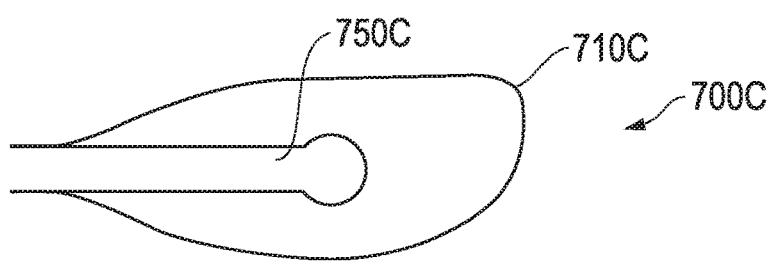

FIGS. 7A, 7B, and 7C are diagrams illustrating examples of the arrangement of a light guide on an outer surface of a camera module housing.

Referring to FIG. 7A, another example provides a light guide 750A arranged at the outer periphery of the camera module housing 710A of the camera module 700A (i.e. the part that points towards the street). The light guide 750A is arranged in the surface of the camera module housing 710A so that the light from the LED can be seen from the side and from behind the vehicle.

Referring to FIG. 7B, similar to FIG. 7A, another example provides a light guide 750B arranged at the outer periphery of the camera module housing 710B of the camera module 700B (i.e. the part that points towards the street). The light guide 750B is arranged in the surface of the camera module housing 710B so that the light from the LED can be seen from the side and from behind the vehicle.

Referring to FIG. 7C, similar to FIGS. 7A and 7B, another example provides a light guide 750C arranged at the outer periphery of the camera module housing 710C of the camera module 700C (i.e. the part that points towards the street). The light guide 750C is arranged in the surface of the camera module housing 710C so that the light from the LED can be seen from the side and from behind the vehicle.

Figure 8:
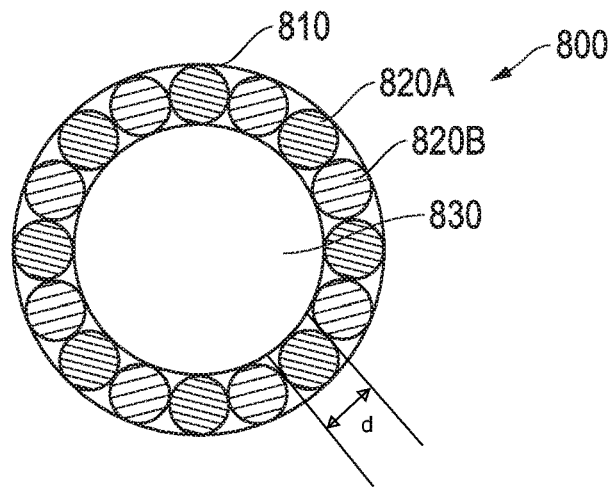
FIG. 8 is a diagram illustrating an arrangement of light passages connected to LEDs of different colors.

FIG. 8 is a diagram illustrating an arrangement of light passages connected to LEDs of different colors.

Referring to FIG. 8, another example of a camera module 800 is illustrated. In this example, the light passages 820A, 820B are arranged around a periphery of a camera lens 830 and within the boundary formed by the camera module housing 810. In this example, some of the light passages 820A are configured to receive light of a first color and some of the light passages 820B are configured to receive light of a second, different color. The signaling lamp could be used to radiate light in different colors, i.e. depending on a desired application. For example, orange light when used as indicator, red light when used as warning light for blind spot detection, and green or blue light for signaling that the car is being locked/unlocked. Still referring to FIG. 8, in an example, a diameter of any of the light passages 820A, 820B may range from 0.2 mm to 15 mm.

Figure 9A:
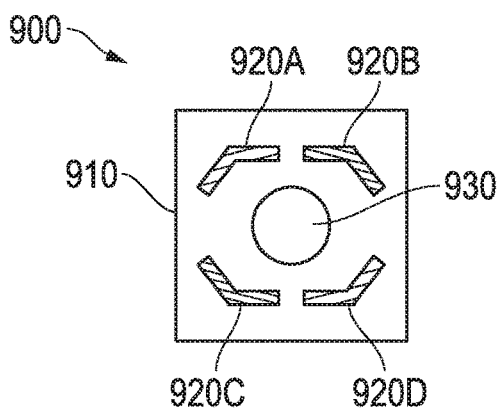
FIGS. 9A and 9B are diagrams illustrating an arrangement of light passages connected to two color LEDs.
Figure 9B:
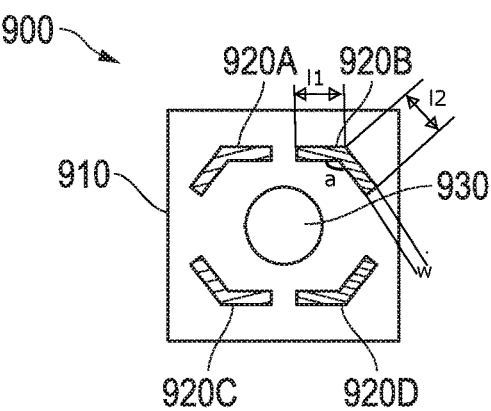

FIGS. 9A and 9B are diagrams illustrating an arrangement of light passages connected to two color LEDs.

In this example, four light passages 920A, 920B, 920C, and 920D are arranged between a camera lens 930 and the boundary formed by the camera housing 910. The camera module 900 is configured to flash according to a desired application. For example, as illustrated in FIG. 9A, at a first time period, the first light passage 920A and the fourth light passage 920D can have the same color, while the second light passage 920B and the third light passage 920C can have a second, different color. As illustrated in FIG. 9B, at a second time period, the first light passage 920A and the third light passage 920C can have the same color, while the second light passage 920B and the fourth light passage 920D can have a second, different color. Any number of iterations can be appreciated to a person having ordinary skill in the art.

Still referring to FIG. 9B, a first length 11 of any of the light passages 920A, 920B, 920C, 920D may range from 0.25 mm-17.5 mm and a second length 12 may range from 0.25 mm-17.5 mm and be different or the same such that an overall length 11 and 12 may range from 0.5 mm to 35 mm. A width w may range from 0.2 mm to 15 mm and an angle a around the lens may range from 90 degrees to 175 degrees, as illustrated in FIG. 9B.

Figure 10A:
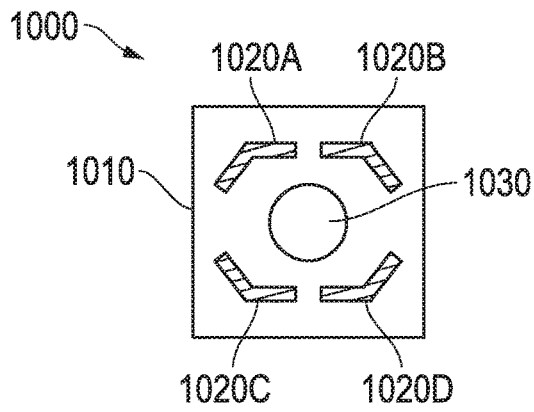
FIGS. 10A and 10B are diagrams illustrating another arrangement of light passages connected to two color LEDs.
Figure 10B:
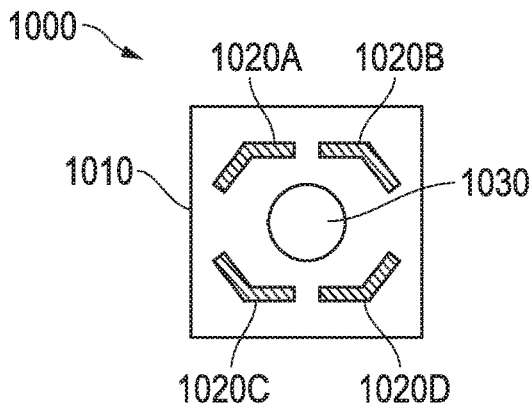

FIGS. 10A and 10B are diagrams illustrating another arrangement of light passages connected to two color LEDs.

In this example, four light passages 1020A, 1020B, 1020C, and 1020D are arranged between a camera lens 1030 and the boundary formed by the camera housing 1010. The camera module 1000 is configured to radiate a different color light according to a desired application. For example, as illustrated in FIG. 10A, at a first time period, all light passages 1020A-D can have the same first color. As illustrated in FIG. 10B, at a second time period, all light passages 1020A-D can have a second, different color. Any number of iterations can be appreciated to a person having ordinary skill in the art.

In another example, the camera module may include a signal lamp having only a single light source, for example a first light source, that is adapted to radiate light having a first color and a second color the first color being different from the second color. Such a light source may include a multi-color LED or any other light source that is adapted to radiate light having more than one color.

Figure 11:
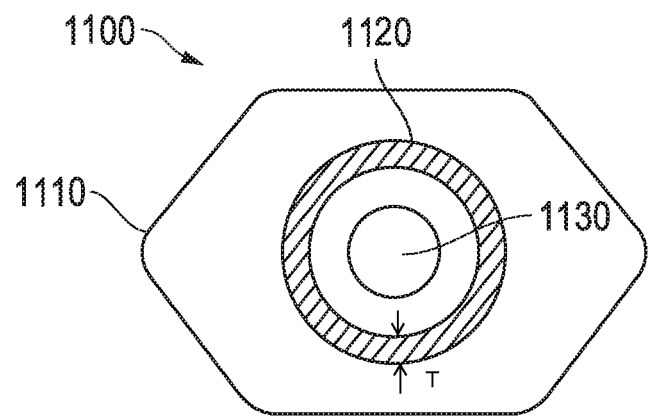
FIG. 11 is a diagram illustrating a single light passage arranged on a camera module housing.

Further, the camera module may include a single opening for example, but not limited to, a circle formed around the circumference of the camera lens. Referring to FIG. 11, a single light passage 1120 is arranged between a camera lens 1130 and the boundary formed by the camera module housing 1110. A thickness T of the light passage 1120 may, for example, range from 0.2 mm to 15 mm along the entire circumference of the light passage 1120. The camera module 1100 is configured to radiate different color light according to a desired application and in accordance with the examples described in this application. Any number of iterations can be appreciated to a person having ordinary skill in the art.

Figure 12:
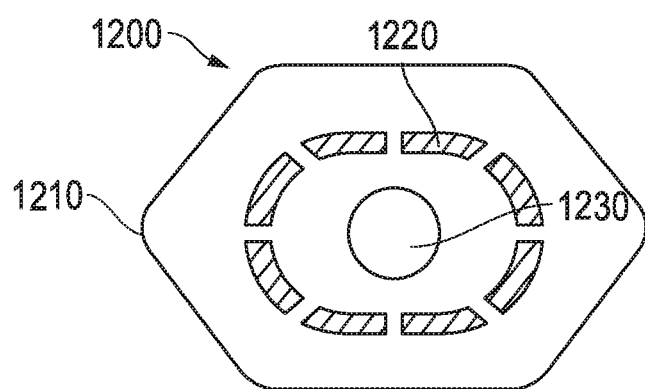
FIG. 12 is a diagram illustrating a plurality of light passages arranged on a camera module housing.

FIG. 12 is a diagram illustrating another example of a camera module 1200. In this example, a plurality of openings 1120 are arranged in an oval configuration around the camera lens 1230 and within a boundary formed by the camera module housing 1210. The camera module 1200 is configured to radiate different color light according to a desired application and in accordance with the examples described in this application. Any number of iterations can be appreciated to a person having ordinary skill in the art.

Figure 13:
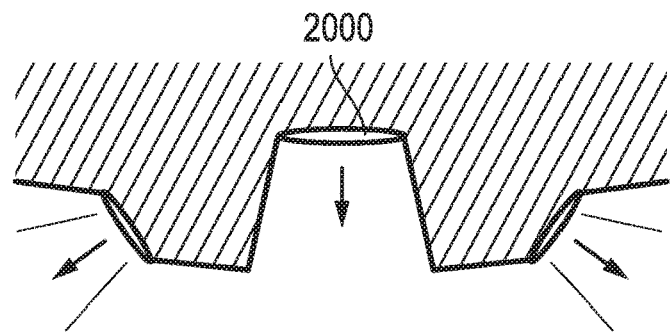
FIG. 13 is a diagram illustrating a first example of isolating a signal of a light source by alignment of the light source.

In addition, a number of different examples may be applied for isolating the light source and the light radiated by the light source from the camera. FIG. 13 is a diagram illustrating a first example of isolating a signal of a light source by alignment of the light source at angle with the camera 2000. In this example, the light source and the light emitted is arranged and radiated at an angle for isolation of the light.

Figure 14:
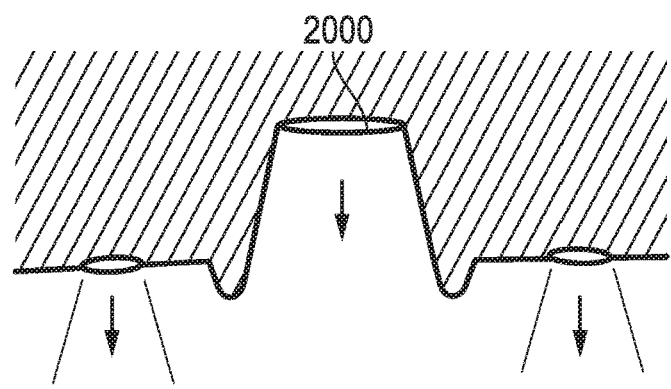
FIG. 14 is a diagram illustrating a second example of isolating a signal of a light source by including the light source as an integrated part of the camera module.

FIG. 14 is a diagram illustrating a second example of isolating a signal of a light source by including the light source as an integrated part of the camera 2000. In this example, the light source may include a bar, for example as illustrated in the drawing, which is integrated with the camera 2000.

Figure 15:
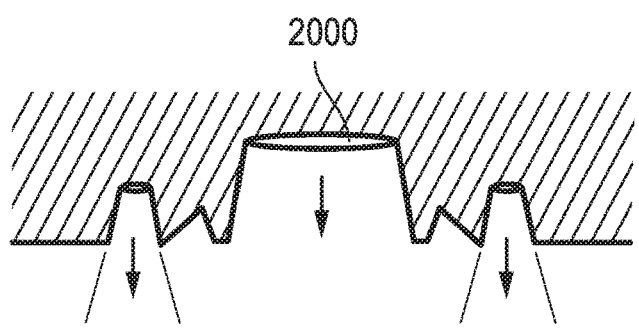
FIG. 15 is a diagram illustrating a third example of isolating a signal of a light source by including the light source in a slot if the camera module.

FIG. 15 is a diagram illustrating a third example of isolating a signal of a light source by including the light source in a slot of the camera module. In this example, the light source may be integrated in the camera module and in a slot that is positioned adjacent to the camera 2000 for isolating the light source and the radiated light from the camera 2000.

Figure 16:
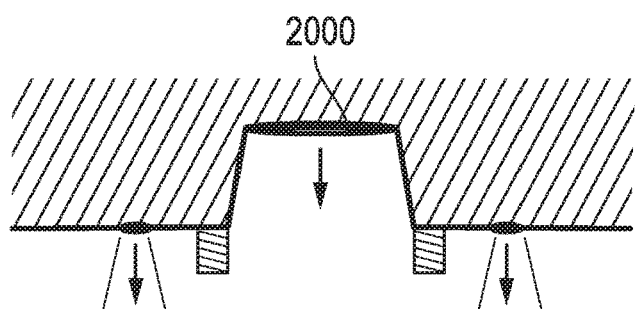
FIG. 16 is a diagram illustrating a fourth example of isolating a signal of a light source by including the light source as an attached part.

FIG. 16 is a diagram illustrating a fourth example of isolating a signal of a light source by including a separating bar, chrome ring, or some other isolating feature as an attached part. In this example, the attachable bar can be a different material that is attached adjacent to the camera 2000 and outside the camera module, as illustrated in the drawings.

According to these examples and the examples provided throughout the application, the light source may be isolated from the camera 2000 so that a signal from the light source does not interfere with an input of the camera 2000. Also, a signal of the light source is configured to be recognized by the driver but does not interfere with an input of the camera 2000.

It should be appreciated that specific colors of light are radiated for specific functions. For example, an orange light may be radiated for a turn light, a red or magenta light may be radiated for a blind spot indication, a yellow or light yellow light may be emitted for notifying that an item was forgotten in the vehicle such as a key or a smarphone, a yellow or dark yellow light for object detection warning, a purple light for a welcome, a green light for ambiance, among different examples of different colored lights for different applications. It should be appreciated that the color of the light and application is not limited to the examples provided herein. It is appreciated that several colors are legally restricted in certain jurisdictions such as blue or white forward light.

Figure 17:
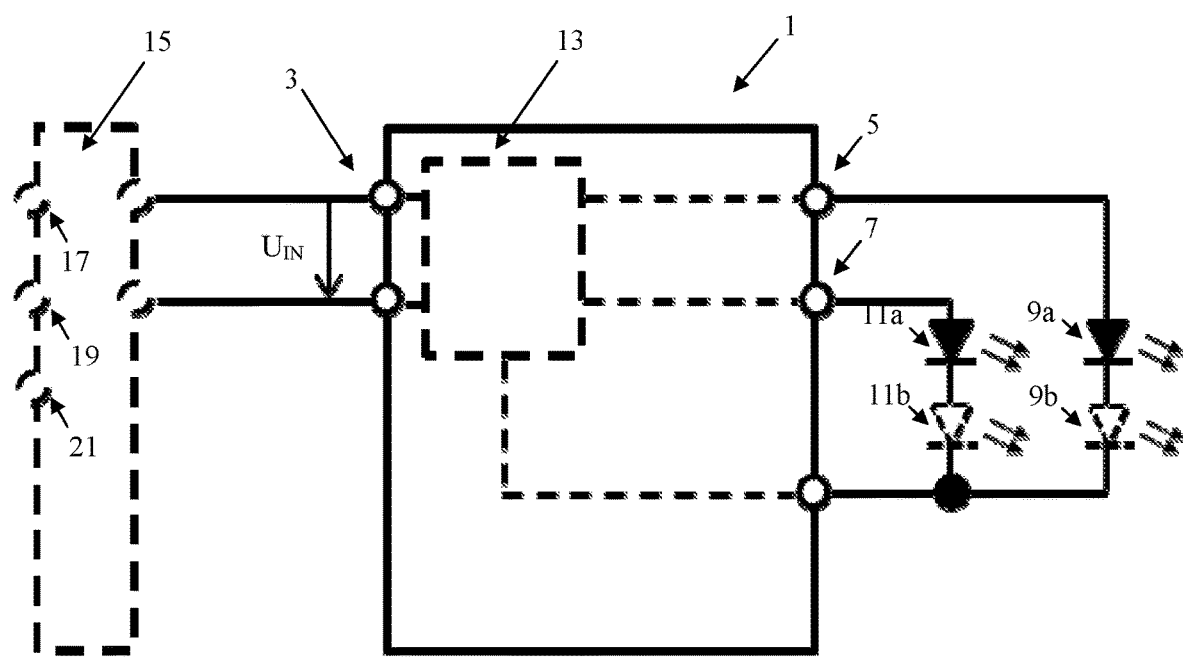
FIG. 17 is a diagram illustrating an example of a schematic view of a control circuit and a monitoring circuit.

FIG. 17 is a diagram illustrating an example of a schematic view of a control circuit and a monitoring circuit.

Referring to FIG. 17, the control circuit 1 for controlling a lighting application in a vehicle includes a voltage input channel 3 for receiving an input voltage $U_{IN}$, and a first output channel 5 and a second output channel 7. From FIG. 17, it can be seen that the first and second lighting devices comprise light sources 9a, 9b, 11a, 11b and are connected to the output channels 5, 7. In the shown example, two light sources 9a, 9b, 11a, 11b are connected to each output channel 5, 7. However, the skilled person would know that in embodiments of the invention only one single light sources 9a, 11a could be connected to each output channel 5, 7. Therefore, the second light sources 9b, 11b are shown with dotted lines.

Also shown with dotted lines is a filter circuit 13 that can be used in some embodiments of the invention to extract the first information and the second information from the input voltage $U_{IN}$. Depending on the first information and the second information, the first output channel 5 is adapted to control the on and off states of the first lighting device light sources 9a, 9b connected thereto, and the second output channel 7 is adapted to control the on and off states of the second lighting device light sources 11a, 11b connected thereto. The skilled person would know that the filter circuit 13 could comprise two transistor to switch between the lighting devices, i.e. depending on the input voltage $U_{IN}$.

FIG. 17 also illustrates a monitoring circuit 15 that could be connected in some embodiments to the control circuit 1 and which could be adapted to supply the input voltage $U_{IN}$ to the control circuit 1. As it is exemplarily shown in FIG. 17, the monitoring circuit 15 could comprise various interfaces, e.g. a first interface 17 for connecting a RFID receiver, a second interface 19 for connecting a GPS receiver, and a third interface 21 for connecting an Onboard Diagnostic System. The skilled person should appreciate, however, that the monitoring circuit 15 could also comprise just one of the above mentioned interfaces, and that the input voltage $U_{IN}$, i.e. the first and second information, is generated based on signals on the interfaces 17, 19, 21. Here, it should be appreciated by a person having ordinary skill in the art that the monitoring circuit 15 could be comprised in a Electronic Control Unit, ECU.

Figure 18:
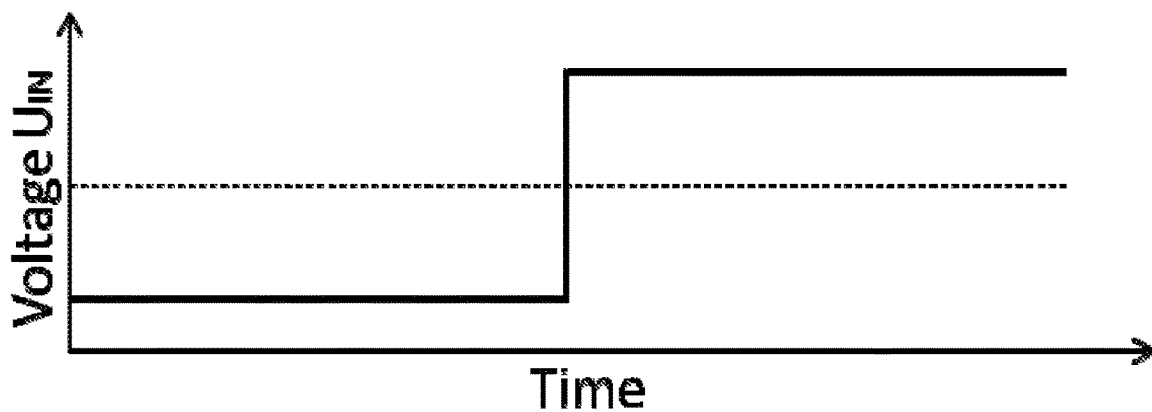
FIG. 18 is a diagram illustrating an example of a schematic voltage versus time diagram of an input voltage.

FIG. 18 illustrates a schematic voltage versus time diagram of an input voltage $U_{IN}$ according to a first embodiment of the invention. In the figure, a dotted line is used to indicate the threshold, or threshold voltage. As it can be seen from the figure, the voltage remains at a level below the threshold for some period of time. By measuring the input voltage $U_{IN}$ it can be determined that the first information is conveyed by the input voltage $U_{IN}$, because the input voltage $U_{IN}$ is below the threshold. In that case, the first output channel turns on the first lighting device, and the second output channel turns off the second lighting device, or keeps the second lighting device turned off. When the input voltage $U_{IN}$ raises above the threshold, the first output channel turns the first lighting device off, and the second output channel turns the second lighting device on, i.e. for as long as the input voltage $U_{IN}$ is above the threshold.

Figure 19:
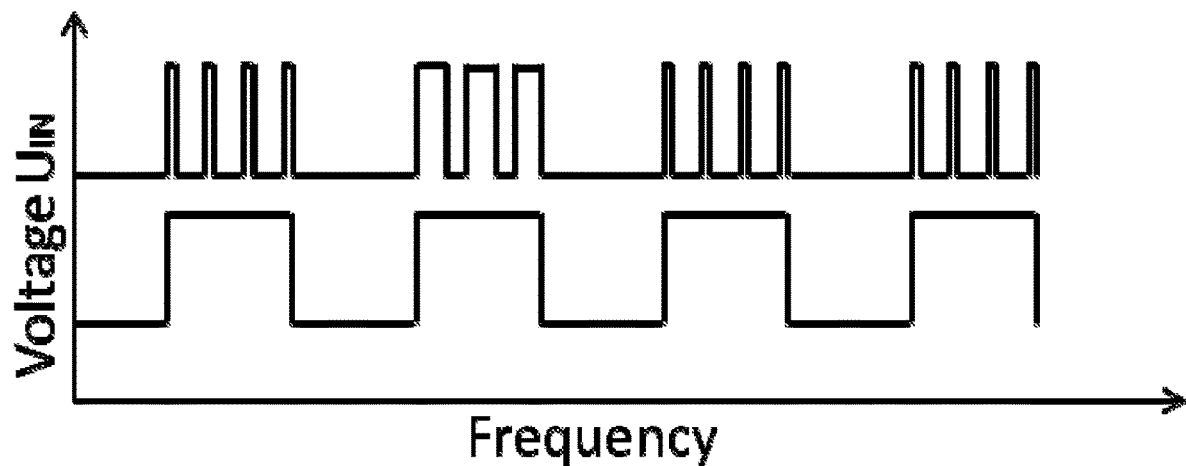
FIG. 19 is a diagram illustrating another example of a schematic voltage versus frequency diagram of an input voltage.

FIG. 19 shows a schematic voltage versus frequency diagram of an input voltage according to a second embodiment of the invention. Here, on the top of the diagram, the input voltage $U_{IN}$ is shown as pulsed input voltage alternating between high and low, e.g. on and off, respectively. The frequency could be, for example, in the region of 1 Hz. On the bottom of the diagram a duty cycle rate is exemplarily shown. In the context of this invention, the term "duty cycle" is used to define the percentage of one period in which the input voltage $U_{IN}$ is high, or switched on, respectively. In the first, third and fourth periods that are exemplary shown in FIG. 19, the duty cycle might be 20%, and hence might allow the determination that the first information is conveyed in the input voltage $U_{IN}$. In the second period that is exemplarily shown in FIG. 19, the duty cycle might be 50%, and hence might allow the determination that the second information is conveyed in the input voltage $U_{IN}$.

Figure 20:
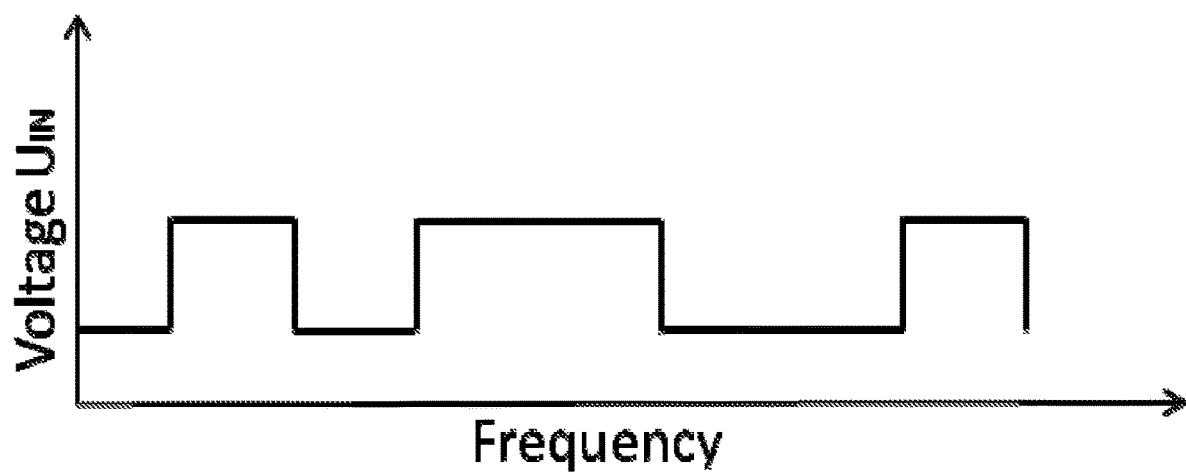
FIG. 20 is a diagram illustrating yet another example of a schematic voltage versus frequency diagram of an input voltage.

FIG. 20 illustrates a schematic voltage versus frequency diagram of an input voltage according to a third embodiment of the invention. Here, it is exemplarily shown that the first and third periods have a higher frequency than the second period. Therefore, determining the higher and/or lower frequency allows to determine that either the first and/or the second information is conveyed.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A camera module of a vehicle, comprising:
    a signal lamp comprising a first light source, and adapted to radiate light having a first color and a second color the first color being different from the second color; and
    a camera module housing comprising a first opening and a second opening in an aperture of the camera module housing adapted to allow for light passing through from the first light source;
    a second light source; and
    the second opening in the aperture of the camera module housing adapted to allow for light passing through from the first light source or the second light source,
    wherein the first and second openings are arranged around a lens of a camera,
    wherein the first light source is a light emitting diode (LED) that is arranged at a rear portion of the camera module housing, and the camera module further comprises a plurality of light guides connecting the LED to the first opening and the second opening so that the first opening and the second opening radiate the light provided by the LED,
    wherein the first light source radiates the light having the first color and the second light source radiates the light having the second color,
    wherein the first light source and the second light source are light emitted diodes (LED) that are configured to emit both the first color and the second color, and
    wherein the first light source and the second light source are both configured to radiate the light having the first color at a first time interval according to a first desired application and are both configured to radiate the light having the second color at a second time interval according to a second desired application.

2. The camera module of claim 1, wherein the first and second openings are positioned on a boundary formed at an edge of the lens of the camera, or are positioned on a boundary formed at an edge of the camera module housing.

3. The camera module of claim 1, wherein the first light source is adapted to radiate the light having the first color in response to a first event at the first time interval and the second light source is adapted to radiate the light having the second color in response to a second event at the second time interval.

4. The camera module of claim 1, wherein the first light source and the second light source are both configured to radiate a first light when used as indicator, a second light when used as warning light for blind spot detection, and a third and fourth light for signaling that the vehicle is being locked and unlocked.

5. The camera module of claim 1, wherein the camera module housing further comprises a third opening and a fourth opening, and wherein the first opening, the second opening, the third opening, and the fourth opening are symmetrically arranged about the lens of the camera.

6. The camera module of claim 1, further comprising a control circuit for controlling lighting of the signal lamp.

7. The camera module of claim 1, further comprising a light guide, wherein the light guide is positioned at least partly on an outer periphery of the camera module housing.

8. The camera module of claim 1, wherein the first opening and the second opening have a circular, ovular, square, rectangular, triangular, octagonal, icon, or other freeform shape.

9. The camera module of claim 1, wherein the first light source and the second light source are Light Emitting Diodes (LEDs), light bulbs, halogen lamps, xenon lamps, neon lamps, electrodeless lamps, or any light source.

10. The camera module of claim 1, wherein a signal of the first light source does not interfere with an input of the camera.

11. The camera module of claim 1, wherein a signal of the first light source is configured to be recognized by a driver but does not interfere with an input of the camera.

12. The camera module of claim 1, wherein each function is assigned to a specific light color or a specific light source.

13. A camera module of a vehicle, comprising:
    a signal lamp comprising a first light source, and adapted to radiate light having a first color and a second color the first color being different from the second color;
    a camera module housing comprising a first opening and a second opening in an aperture of the camera module housing adapted to allow for light passing through from the first light source; and
    a second light source
    wherein the first and second openings are arranged around a lens of a camera,
    wherein the first light source is a light emitting diode (LED) that is arranged at a rear portion of the camera module housing, and the camera module further comprises a plurality of light guides connecting the LED to the first opening and the second opening so that the first opening and the second opening radiate the light provided by the LED
    wherein the second opening in the aperture of the camera module housing adapted to allow for light passing through from the first light source or the second light source,
    wherein the first light source radiates light having the first color and the second light source radiates light having the second color,
    wherein the first light source and the second light source are light emitted diodes (LED) that are configured to emit both the first color and the second color, and
    wherein the first light source is adapted to radiate the light having the first color and the second light source is adapted to radiate the light having the second color in response to a first event at a first time interval, and the first light source is adapted to radiate the light having the second color and the second light source is adapted to radiate the light having the first color in response to a second event at a second time interval.

14. A camera module of a vehicle, comprising:
    a signal lamp comprising a first light source, and adapted to radiate light having a first color and a second color the first color being different from the second color;
    a camera module housing comprising a first opening and a second opening in an aperture of the camera module housing adapted to allow for light passing through from the first light source; and a second light source wherein the first and second openings are arranged around a lens of a camera, wherein the first light source is a light emitting diode (LED) that is arranged at a rear portion of the camera module housing, and the camera module further comprises a plurality of light guides connecting the LED to the first opening and the second opening so that the first opening and the second opening radiate the light provided by the LED wherein the second opening in the aperture of the camera module housing adapted to allow for the light passing through from the first light source or the second light source, wherein the first light source radiates light having the first color and the second light source radiates light having the second color, wherein the first light source and the second light source are light emitted diodes (LED) that are configured to emit both the first color and the second color, and wherein the first light source and the second light source are both configured to radiate the light having the first color at a first time interval according to a first desired application and are both configured to radiate the light having the second color at a second time interval according to a second desired application.

15. A camera module of a vehicle, comprising:

a signal lamp comprising a first light source, and adapted to radiate light having a first color and a second color the first color being different from the second color;

a camera module housing comprising a first opening and a second opening in an aperture of the camera module housing adapted to allow for light passing through from the first light source; and a second light source wherein the first and second openings are arranged around a lens of a camera, wherein the first light source is a light emitting diode (LED) that is arranged at a rear portion of the camera module housing, and the camera module further comprises a plurality of light guides connecting the LED to the first opening and the second opening so that the first opening and the second opening radiate the light provided by the LED wherein the second opening in the aperture of the camera module housing adapted to allow for light passing through from the first light source or the second light source, wherein the first light source radiates the light having the first color and the second light source radiates light having the second color, wherein the first light source and the second light source are light emitted diodes (LED) that are configured to emit both the first color and the second color, and wherein the first light source and the second light source are both configured to radiate a first light when used as indicator, a second light when used as warning light for blind spot detection, and a third and fourth light for signaling that the vehicle is being locked and unlocked.

* * * * *